July 24, 1951  P. M. SHOOK  2,561,756
RUNNING BOARD LIGHT FOR AUTOMOBILES
Filed Oct. 7, 1949
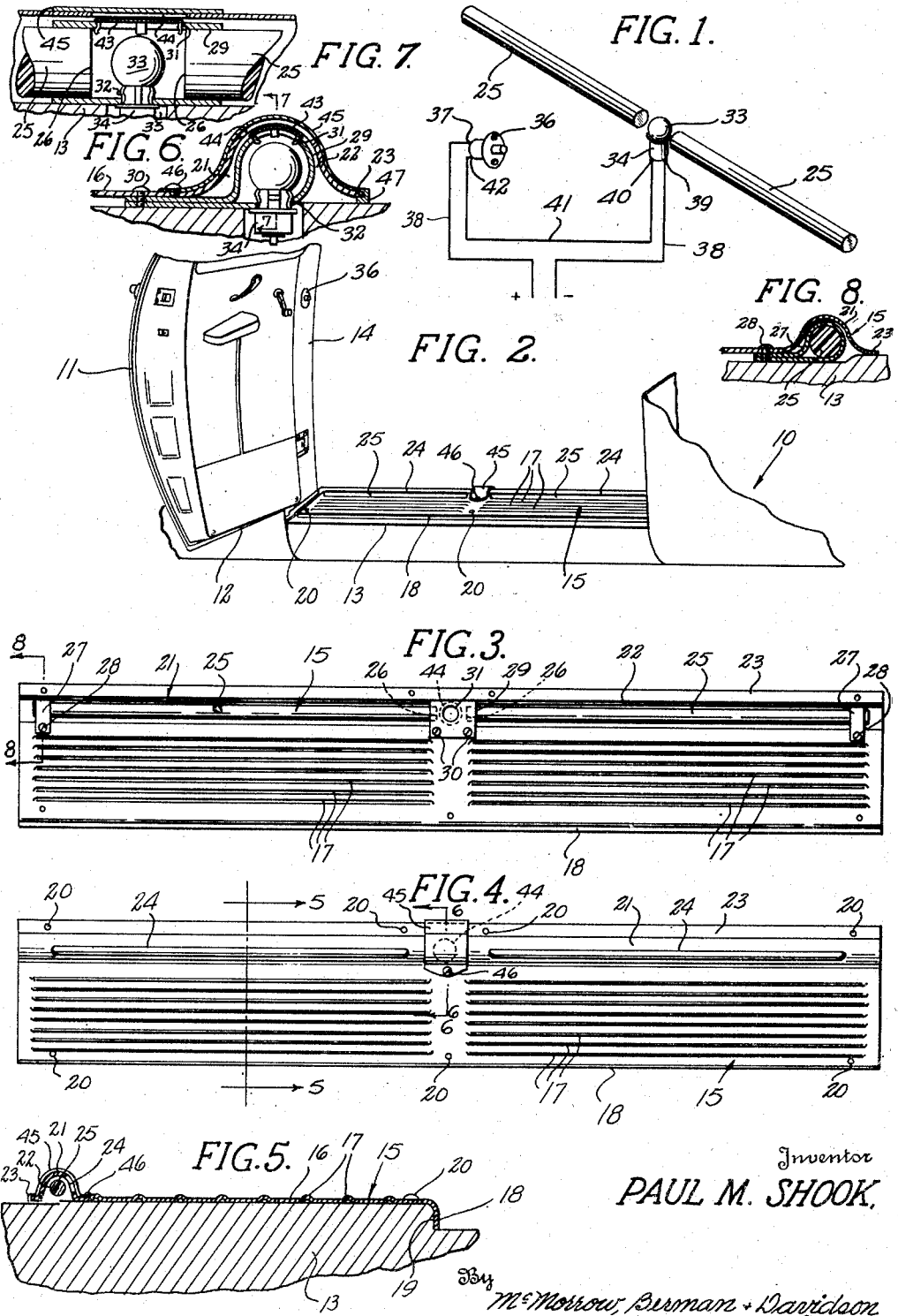
Inventor
PAUL M. SHOOK,
By McMorrow, Birman & Davidson
Attorneys Patented July 24, 1951

2,561,756

UNITED STATES PATENT OFFICE 2,561,756

RUNNING BOARD LIGHT FOR AUTOMOBILES

Paul M. Shook, Greentown, Ohio

Application October 7, 1949, Serial No. 120,064

3 Claims. (Cl. 240—8.26)

My invention relates to a running board light for automobiles and the like.

An important object of my invention is to provide a running board light which will illuminate substantially the entire length of the running board of an automobile, by utilizing the light of one small light bulb.

A further object is to provide a running board light which will emit a soft non-glaring light, and not a glaring or harsh light.

A further object is to provide a running board light, the principal parts thereof being protected beneath the usual scuff plate of the running board.

A further object is to provide a running board light which will glow whenever the door of the automobile is opened, and which will be extinguished when the door is closed.

A still further object of my invention is to provide an automobile running board light which is highly simplified, compact, durable and quite inexpensive to build into the automobile.

Other objects and advantages of my invention will be apparent during the course of the following description.

In the accompanying drawings, forming a part of this application, and in which like numerals are employed to designate like parts throughout the same, Figure 1 is a perspective view, partly diagrammatic, showing electrical and illuminating elements of a running board light embodying my invention, Figure 2 is a fragmentary perspective view of an automobile running board equipped with the light embodying the invention, Figure 3 is a bottom plan view of a scuff plate and illuminating elements, Figure 4 is a top plan view of the same, Figure 5 is a transverse vertical section taken on line 5—5 of Figure 4, Figure 6 is a similar section taken on line 6—6 of Figure 4, Figure 7 is a fragmentary longitudinal vertical section taken on line 7—7 of Figure 6, and Figure 8 is a transverse vertical section taken on line 8—8 of Figure 3.

In the drawings, where for the purpose of illustration is shown a preferred embodiment of my invention, the numeral 10 designates generally one side of an automobile body having a door 11, the bottom edge 12 of which is adapted to close over the usual concealed running board 13. The door 11 is hingedly connected to the body adjacent to the usual generally vertical door post 14, as shown.

The running board 13 is provided with the usual sheet metal scuff plate 15 which extends for substantially the entire length and width of the running board. The scuff plate 15 comprises an elongated generally flat rectangular plate or body portion 16, which may be corrugated or fluted, as at 17 to keep the feet from slipping. At its outer longitudinal edge, the scuff plate has a short depending longitudinal flange 18 which engages a vertical longitudinal ridge or shoulder 19 of the running board. The scuff plate 15 may be rigidly secured in place upon the running board by screws 20, or the like. Near and inwardly of the rear longitudinal edge of the scuff plate 15, the same is formed to provide an upstanding inverted U-shaped longitudinal rib 21 or tubular sill, forming a continuous horizontal longitudinal passage 22, extending for the entire length of the scuff plate. Rearwardly of the tubular sill 21, the scuff plate includes a narrow flat longitudinal extension or flange 23, integral therewith and disposed at the same elevation as the body portion 16, and adapted to engage the top of the running board 13. Formed in the forward side of the tubular sill 21 are a pair of longitudinal straight elongated slots 24, spaced apart at their inner ends, adjacent to the longitudinal center of the scuff plate, and extending for substantially the entire length of the scuff plate, as shown.

Arranged within the passage 22 formed by the tubular sill 21 is a pair of elongated longitudinally arranged straight cylindrical rods 25 of "Lucite," or like light transmitting plastics material. The rods 25 extend for substantially the entire length of the scuff plate and running board and have their inner ends 26 spaced apart adjacent to the longitudinal center of the scuff plate and between the inner ends of the slots 24. The rods 25 have their outer ends rigidly secured in place within the passage 22 by means of cable type clips 27, secured to the bottom of the body portion 16 by screws 28, or the like. The inner ends of the rods 25 engage within the opposite ends of a center wide cable type clip 29, arranged at the longitudinal center of the scuff plate 15 and secured thereto by screws 30 or the like. The inner ends 26 of the rods 25 are spaced apart within the wide center clip 29, Figure 7, and the top and bottom sides of the clip 29 are provided with large vertically aligned openings 31 and 32, for a purpose to be described. The tops of the clips 27 and 29 project into the passage 22 for positioning the rods 25 therein, and the rods are held bodily above the level of the body portion 16 as shown, so that the scuff plate 15 may lie flat upon the running board. A small electric light bulb 33 is positioned at the longitudinal center of the running board and between the ends 26 of the "Lucite" rods 25, Figure 7. The bulb 33 is arranged within the passage 22 as shown, and is mounted within a suitable socket 34 which may be regidly mounted within a small recess 35 formed in the running board below the scuff plate. The light bulb 33 projects through the lower opening 32 of the center clip 29. A plunger type switch 36 is mounted upon the door post 14 to be actuated by the opening and closing of the door 11. One terminal 37 of the switch 36 is connected by a wire 38 to one terminal 39 of the light bulb 33. The other terminal 40 of the light bulb is connected by a wire 41 to the other terminal 42 of the switch 36. The wire 38 is connected in the storage battery circuit of the automobile, as shown in Figure 1. Whenever the door 11 is closed, the switch 36 is open and the circuit through the light bulb is broken, so that the bulb will not glow. When the door 11 is open the switch 36 is closed for closing the circuit through the light bulb which will then glow. Whenever the light bulb 33 glows, the light given off by it is transmitted through the "Lucite" rods 25 which will also glow with a soft light. These rods are positioned adjacent to the longitudinal slots 24 of the scuff plate, and since these slots are formed upon the forward side of the tubular sill 21, the running board will be illuminated forwardly of the sill 21.

A removable cap or grommet 43 is positioned in the top opening 31 of the clip 29 and is removable through an opening 44 formed at the longitudinal center of the tubular sill 21. The grommet 43 is removed when it is desired to change or replace the light bulb 33, without necessitating the lifting of the entire scuff plate 15. A readily removable clip or cover 45 is mounted upon the scuff plate adjacent to the opening 44 for covering this opening. The clip 45 is held in place by a screw 46, and the clip 45 includes a rear flange 47 which engages below the rear longitudinal flange 23.

The running board will be illuminated from any angle, because the light emitting through the slots 24 will play over substantially the entire running board. However, passengers entering the vehicle will be looking directly at the glowing "Lucite" bars 25, and these elements will clearly define the step which must be taken when entering the automobile. The device thus forms an important safety feature.

It is to be understood that the form of the invention herewith shown and described is to be taken as a preferred example of the same, and that various changes in shape, size and arrangement of parts may be resorted to, without departing from the spirit of my invention or the scope of the subjoined claims.

Having thus described my invention, I claim:

1. A running board illuminating unit comprising a generally flat wear resistant plate mounted upon the running board and extending throughout a substantial portion of the length of the same, the plate having a raised portion forming an elongated substantially straight casing extending throughout the major portion of the length of the plate and having longitudinal slots formed therein for emitting light, a pair of substantially straight elongated light transmitting rods arranged within the casing in end to end opposed relation and extending throughout substantially the entire length of the casing, the inner opposed ends of the rods being spaced apart longitudinally, clips engaging the outer ends of the rods for holding the same stationary and secured to the bottom of the wear resistant plate, a common center clip engaging the inner opposed ends of the rods for holding the same stationary and secured to the bottom of the wear resistant plate, the common center clip being provided in its bottom with an opening, and a light bulb mounted upon the running board and projecting above the same and arranged adjacent to the common center clip, the light bulb projecting through the opening in the bottom of the center clip and into said casing between the inner ends of the rods.

2. A running board illuminating unit comprising a generally flat wear resistant plate mounted upon the running board and extending throughout a substantial portion of the length of the same, the plate having a raised portion forming an elongated substantially straight casing extending throughout the major portion of the length of the plate and having longitudinal slots formed therein for emitting light, a pair of substantially straight elongated light transmitting rods arranged within the casing in end to end opposed relation and extending throughout substantially the entire length of the casing, the inner opposed ends of the rods being spaced apart longitudinally, clips engaging the outer ends of the rods for holding the same stationary and secured to the bottom of the wear resistant plate, a common center clip engaging the inner opposed ends of the rods for holding the same stationary and secured to the bottom of the wear resistant plate, the common center clip being provided in its top and bottom with aligned openings, a light bulb mounted upon the running board and projecting above the same adjacent to the common center clip, the light bulb projecting through the opening in the bottom of said center clip and into said casing between the inner ends of the rods, and a removable cover for the opening in the top of the center clip to prevent the passage of light through such opening, the light bulb being removable through the last-named opening when said cover is removed.

3. A running board illuminating unit comprising a generally flat wear resistant plate mounted upon the running board and extending throughout a substantial portion of the length of the same, the plate having a raised portion forming an elongated substantially straight casing extending throughout the major portion of the length of the plate and having longitudinal slots formed therein for emitting light, a pair of substantially straight elongated light transmitting rods arranged within the casing in end to end opposed relation and extending throughout substantially the entire length of the casing, the inner opposed ends of the rods being spaced apart longitudinally, clips engaging the outer ends of the rods for holding the same stationary, said clips having holding portions surrounding the rods and disposed within the casing and flat transverse extensions projecting between the running board and plate and secured to the bottom of the plate, a common center clip engaging the inner opposed ends of the rods for holding the same stationary, said common center clip having a holding portion surrounding the rods and disposed within the casing and flat transverse extensions projecting between the running board and plate and secured to the bottom of the plate, the common center clip being provided in its bottom with an opening, and a light bulb mounted upon the running board and projecting above the same and arranged adjacent to the common center clip, the light bulb projecting through the opening in the bottom of the center clip and into said casing between the inner ends of the rods.

PAUL M. SHOOK.

REFERENCES CITED

The following references are of record in the file of this patent:

UNITED STATES PATENTS

| Number | Name | Date |
| --- | --- | --- |
| 1,439,210 | Webster | Dec. 19, 1922 |
| 1,739,954 | Du Pont | Dec. 17, 1929 |
| 2,081,899 | Bridge | June 1, 1937 |
| 2,207,117 | Collins | July 9, 1940 |
| 2,214,447 | Bave | Sept. 10, 1940 |
| 2,247,969 | Stewart | July 1, 1941 |
| 2,452,294 | Dickson | Oct. 26, 1948 |